Figure 1:
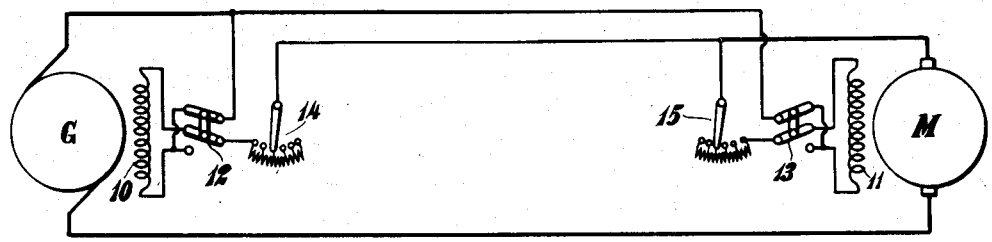

No. 867,154. PATENTED SEPT. 24, 1907.
W. J. RICHARDS.
SYSTEM OF MOTOR CONTROL.
APPLICATION FILED SEPT. 29, 1906.

Witnesses
Oliver W. Sharman
Fred J. Kinsey

Inventor
Walter J. Richards
By
Chas. E. Lord
Attorney

UNITED STATES PATENT OFFICE.

WALTER J. RICHARDS, OF NORWOOD, OHIO, ASSIGNOR TO ALLIS-CHALMERS COMPANY, A CORPORATION OF NEW JERSEY.

SYSTEM OF MOTOR CONTROL.

No. 867,154.        Specification of Letters Patent.        Patented Sept. 24, 1907.

Application filed September 29, 1906. Serial No. 336,665.

*To all whom it may concern:*

Be it known that I, WALTER J. RICHARDS, a citizen of the United States, residing at Norwood, in the county of Hamilton and State of Ohio, have invented certain new and useful Improvements in Systems of Motor Control, of which the following is a full, clear, and exact specification.

My invention relates to motor control systems and especially to control systems for mill and hoisting motors.

Motors which are used for rolling mills and for mining or other hoisting machinery must be quickly and often reversed. Owing to certain difficulties which have been experienced in electrical systems for doing this work steam engines have been more generally used. My present invention, however, aims to overcome some of the difficulties of prior electrical systems and to provide a motor control system which is both accurate and quickly responsive.

To this end my invention in one aspect comprises the method of controlling an electric motor, which consists in supplying its armature and its field windings from separate sources of electromotive force, and varying the electromotive forces of both of said sources.

From another standpoint, my invention consists of a motor, a generator supplying said motor, and field windings for controlling the field strengths of said generator and said motor, said field windings being in shunt to each other and in series with the generator and motor.

In another aspect my invention consists of a motor, a generator for supplying said motor, and field windings for controlling the field strengths of said generator and said motor respectively which are responsive to the drop in voltage between the generator and the motor.

In still another aspect my invention consists of a motor, a generator for supplying said motor, field windings for controlling the field strengths of said generator and said motor, normally short-circuited resistances in circuit with said field windings, and means for opening said short-circuits when the field strengths of the generator and the motor respectively attain a predetermined value.

From still another point of view my invention comprises the combination of a generator, a motor supplied thereby, and field windings for controlling said generator and said motor respectively which are in shunt to one of the mains connecting the generator and the motor.

Other features of my invention will appear from the description and drawings and will be particularly pointed out in the claims.

The four figures of the drawing represent diagrammatically different modifications of my invention.

Figure 2:
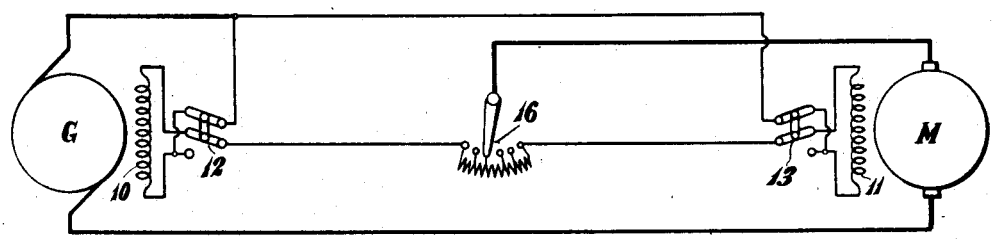
Figure 3:
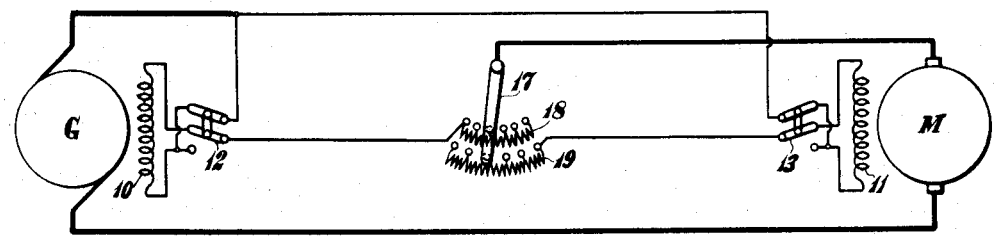

In all of the figures the main or working motor M is supplied with current by the generator G. In Figures 1 to 3 inclusive the generator field winding 10 and motor field winding 11 are in shunt to each other and together form part of one of the leads between the generator and the motor. Thus these field windings are series field windings. The generator field winding may have its connections reversed by means of the reversing switch 12 while the motor field winding is reversible by means of the reversing switch 13. In Fig. 1 the two field windings are adjustable by independent rheostats 14 and 15 respectively. By means of the reversing switches 12 and 13 and the rheostats 14 and 15, the speed and direction of rotation of the motor M may be closely and quickly adjusted, and the motor can be braked by having it act as a generator to supply current to the dynamo G running as a motor.

In Fig. 2 the two field windings 10 and 11 are adjustable by the common rheostat 16 so constructed and arranged that as a section of the rheostat resistance is cut out of one field winding, it is cut into the other field winding, thus varying the field strengths of the generator and the motor inversely. The rheostat 16 may be located at any desirable point, adjacent to the generator or the motor or distant from both.

In Fig. 3 the field windings 10 and 11 are adjustable by the movement of a single rheostat arm 17 but this arm controls independent resistances 18 and 19 in the field circuits 10 and 11 respectively. The action of the rheostat arm 17 is much the same as that of the rheostat 16, but by having independent, and if desired, dissimilar resistances in the two field circuits it is possible to obtain certain results which are not attainable when the same resistance is used for both field circuits.

In Figs. 1, 2 and 3 the motor is quickly responsive to the controlling apparatus, for the action of the series generator and motor in building up is a progressive one and the fields will come up to the maximum almost instantaneously.

Figure 4:
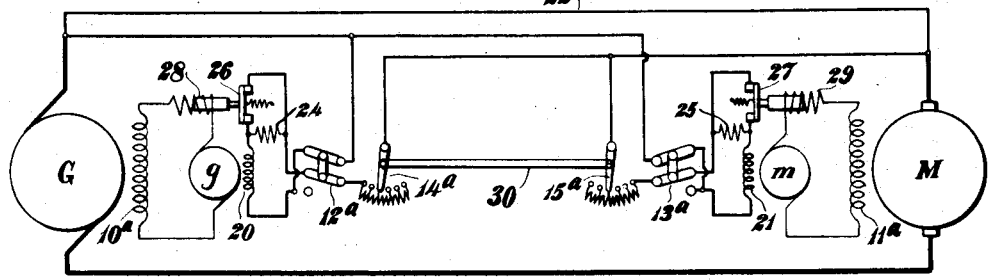

In Fig. 4 the generator and motor field windings $10^a$ and $11^a$ respectively are supplied by small exciters $g$ and $m$ respectively. These exciters may be driven in any desired manner. The fields 20 and 21 of the exciters $g$ and $m$ respectively are connected similarly to the fields 10 and 11 in Fig. 1, and may be reversed by the reversing switches $12^a$ and $13^a$ respectively and adjusted in strength by the rheostats $14^a$ and $15^a$ respectively. If desired, the arms of these two rheostats may be connected as by a bar 30 so that the resistances of the two exciter field circuits may be inversely varied by a single movement. Instead of forming one of the main leads between the generator and the motor, the field circuits 20 and 21 are in shunt to the main 22 and are responsive to the drop in voltage in this main. For this reason the field strengths of the exciters $g$ and $m$ would not ordinarily build up so quickly, because upon the change in current the inductance of the field circuits causes a greater part of the change to be first felt on the non-inductive branch 22. To overcome this, resistances 24 and 25 are placed in the field circuits of the exciters g and m respectively, and the resistances 24 and 25 and the field windings 20 and 21 are so adjusted that when the drop along the line 22 is a maximum it is necessary to have the resistances 24 and 25 in the field circuits 20 and 21 to prevent over-excitation of the field of the exciters. But the resistances 24 and 25 are arranged to be normally short-circuited by means of the normally closed solenoid switches 26 and 27 respectively. Upon an increase in the load and therefore in the drop in voltage in the line 22, a higher voltage is thrown upon the field coils 20 and 21 than that for which they are wound, thus causing the time required for the current in them to reach a certain value to be correspondingly reduced. When the current strength in these coils in the field windings 10$^a$ and 11$^a$ reaches this value, the solenoids 28 and 29 act to open the switches 26 and 27 respectively and insert the resistances 24 and 25 into circuit with the field coils 20 and 21 respectively to prevent over-excitation of the exciter fields. The solenoids 28 and 29 have their magnetic circuits so arranged that while current of a certain value is required to open the switches 26 and 27, the solenoids will not release these switches and allow them to close until the current in the solenoids has diminished nearly to zero, thus allowing the field excitation of the exciter to be reduced practically to a minimum before the resistances 24 and 25 are again short-circuited. If desired in order to increase the proportionate drop in the main 22, the latter may be made of smaller carrying capacity than the other main, as indicated, though often this is not necessary.

The arrangements of Figs. 2 and 3 as well as of Fig. 1 are adapted to be used with the exciter system of Fig. 4, while if desired a main corresponding to the main 22 may be used in the arrangement shown in Figs. 1, 2, and 3 without the use of exciters. However the exciter system and the placing of the controller field coils in shunt to the main 22 are especially adapted to be used together.

Although I have shown the controlling field windings 10 and 11, and 20 and 31 connected in shunt to each other and to the same main, obviously they need not be so connected. Instead they may be connected in several other ways, easily understandable from the foregoing description, and still operate in a more or less similar manner.

Many other modifications in the precise arrangements here shown and described will readily occur to one skilled in the art and all such as come within the spirit and scope of my invention I aim to cover in the following claims.

What I claim as new is:—

1. In combination, a generator, a motor supplied thereby, and series field windings for controlling said generator and said motor respectively, said field windings being in parallel to each other.

2. In combination, a generator, a motor supplied thereby, field windings for controlling said generator and said motor respectively, and connections whereby said field windings are responsive to the drop in voltage between the generator and the motor.

3. In combination, a generator, a motor supplied thereby, and field windings for controlling said generator and said motor respectively which are in shunt to one of the mains connecting the generator and the motor.

4. A system of motor control, comprising a generator, a motor supplied thereby, field windings for controlling said generator and said motor respectively which are in shunt to each other and in series with the motor armature, and rheostats for controlling said field windings.

5. A system of motor control, comprising a generator, a motor supplied thereby, series field windings for controlling said generator and said motor respectively, and a rheostat in series with each field winding for adjusting it.

6. A system of motor control, comprising a generator, a motor supplied thereby, series field windings for controlling said generator and said motor respectively, and a rheostat in series with each field winding, said field windings with their respective rheostats being in shunt to each other.

7. A system of motor control, comprising a generator, a motor supplied thereby, series field windings for controlling said generator and said motor respectively, and means for reversing the connections of said field windings.

8. A system of motor control, comprising a generator, a motor supplied thereby, series field windings for controlling said generator and said motor respectively, said field windings being in shunt to each other, and means for reversing the connections of said field windings.

9. A system of motor control, comprising a generator, a motor supplied thereby, series field windings for controlling said generator and said motor respectively, and means for regulating and reversing the connections of said field windings.

10. A system of motor control, comprising a generator, a motor supplied thereby, series field windings for controlling said generator and said motor respectively, said field windings being in shunt to each other, and means for regulating and for reversing said field windings independently.

11. A system of motor control, comprising a generator, a motor supplied thereby, and exciters for the fields of the generator and the motor respectively, the field windings of said exciters being in series with the armature of the motor.

12. A system of motor control, comprising a generator, a motor supplied thereby, and exciters for the fields of the generator and the motor respectively, the field windings of said exciters being in series with the armature of the motor and in shunt to each other.

13. A system of motor control, comprising a generator, a motor supplied thereby, and an exciter for the field of the motor, the field winding of said exciter being in series with the armature of the motor.

14. A system of motor control, comprising a generator, a motor the armature of which is exclusively supplied thereby, and an exciter for the field of the generator, the field winding of said exciter being in series with the armature of the motor.

15. A system of motor control, comprising a generator, a motor supplied thereby, an exciter for the field of the motor, and connections whereby the field of said exciter is responsive to the drop in voltage in the line between the generator and the motor.

16. A system of motor control, comprising a generator, a motor supplied thereby, and an exciter for the field of the generator, the field of said exciter being responsive to the drop in voltage in the line between the generator and the motor.

17. A system of motor control, comprising a generator, a motor supplied thereby, and exciters for the fields of said generator and said motor respectively, the fields of said exciters being responsive to the drop in voltage in the line between the generator and the motor.

18. A system of motor control, comprising a generator, a motor supplied thereby, and exciters for the fields of said generator and said motor respectively, the fields of said exciters being responsive to the drop in voltage in the line between the generator and the motor.

19. A system of motor control, comprising a generator, a motor supplied thereby, and an exciter for the field of said motor, the field winding of said exciter being in shunt to one of the leads from the generator to the motor.

20. A system of motor control, comprising a generator, a motor supplied thereby, and an exciter for the field of said generator, the field winding of said exciter being in shunt to one of the leads from the generator to the motor.

21. A system of motor control, comprising a generator, a motor supplied thereby, and exciters for the fields of said generator and said motor respectively, the field windings of said exciters being in shunt to one of the leads from the generator to the motor.

22. A system of motor control, comprising a generator, a motor supplied thereby, an exciter for the field of said motor, the field winding of said exciter being in shunt to one of the mains leading from the generator to the motor, and means for regulating the field of said exciter.

23. A system of motor control, comprising a generator, a motor supplied thereby, an exciter for the field of said generator, the field winding of said exciter being in shunt to one of the mains leading from the generator to the motor, and means for regulating the field of said exciter.

24. A system of motor control, comprising a generator, a motor supplied thereby, exciters for the fields of said generator and said motor respectively, the fields of said exciters being responsive to the drop in voltage between the generator and the motor, and means for regulating and reversing the connections of the field coils of said exciters.

25. A system of motor control, comprising a generator, a motor supplied thereby, an exciter for the field of said motor, the field windings of said exciter being in series between the generator and the motor, and means for regulating and reversing the field of said exciter.

26. A system of motor control, comprising a generator, a motor supplied thereby, an exciter for the field of said generator, the field windings of said exciter being in series between the generator and the motor, and means for regulating and reversing the field of said exciter.

27. A system of motor control, comprising a generator, a motor supplied thereby, exciters for the fields of said generator and said motor respectively, the fields of said exciters being responsive to variations in the current supplied by said generator, and means for reversing the connections of said exciter field windings.

28. In combination, a dynamo-electric machine, an exciter for the field thereof, a normally short-circuited resistance in the field circuit of said exciter, and means for opening said short-circuit when the field strength of the dynamo-electric machine attains a predetermined value.

29. In combination, a dynamo-electric machine, a normally short-circuited resistance in its field circuit, and means for opening said short-circuit when the current in its armature attains a predetermined value.

30. In combination, a dynamo-electric machine, an exciter for the field thereof, a normally short-circuited resistance in the field circuit of said exciter, and means for opening said short-circuit when the exciter current attains a predetermined value.

31. In combination, a dynamo-electric machine, an exciter for the field thereof, the field winding of said exciter being in series with the armature of said dynamo-electric machine, and a resistance for the field circuit of said exciter arranged to be cut in when the exciter current attains a predetermined value.

32. In combination, a generator, a motor supplied thereby, exciters for the fields of said generator and said motor respectively, normally short-circuited resistances in the field circuits of said exciters, and means for opening said short-circuits when the field strengths of said generator and said motor attain predetermined values respectively.

33. In combination, a motor, a generator for supplying said motor, field windings for controlling the field strengths of said generator and said motor respectively, normally short-circuited resistances in circuit with said field windings, and means for opening said short-circuits when the field strengths of the generator and the motor attain predetermined values respectively.

34. In combination, a generator, a motor supplied thereby, exciters for the fields of said generator and said motor respectively, and means for varying the electromotive forces of said exciters inversely.

35. The method of controlling an electric motor, which consists in supplying its armature and its field windings from separate sources of electromotive force, and varying the electromotive forces of both of said sources.

36. The method of controlling an electric motor, which consists in supplying its armature and its field windings from two sources of electromotive force respectively, and varying the electromotive forces of said two sources inversely.

37. The method of controlling an electric motor, which consists in supplying its armature and its field windings from separate sources of electromotive force, and varying the electromotive forces of said sources simultaneously and inversely.

38. The method of controlling an electric motor, which consists in supplying its armature and its field windings from separate sources of electromotive force, varying the electromotive forces of both of said sources, and reversing the electromotive force of the field-supplying source.

39. A motor control system comprising an electric motor, two sources of electromotive force for supplying its armature and its field windings respectively, and means for varying the electromotive forces of said two sources inversely.

40. A motor control system comprising an electric motor, separate sources of electromotive force for supplying its armature and its field windings respectively, and means for varying the electromotive forces of said sources simultaneously and inversely.

41. A motor control system comprising an electric motor, separate sources of electromotive force for supplying its armature and its field windings respectively, and means for varying the electromotive forces of both of said sources and for reversing the electromotive force of said field-supplying source.

42. The method of controlling an electric motor, which consists in supplying its armature from a dynamo-electric generator, supplying its field winding and the field winding of said generator from two sources of electromotive force respectively, and varying the electromotive forces of said sources.

43. The method of controlling an electric motor, which consists in supplying its armature from a dynamo-electric generator, supplying its field winding and the field winding of said generator from two sources of electromotive force respectively, and varying the electromotive forces of said sources inversely.

44. The method of controlling an electric motor, which consists in supplying its armature from a dynamo-electric generator, supplying its field winding and the field winding of said generator from two sources of electromotive force respectively, and varying the electromotive forces of said sources simultaneously.

45. The method of controlling an electric motor, which consists in supplying its armature from a dynamo-electric generator, supplying its field winding and the field winding of said generator from two sources of electromotive force respectively, and varying the electromotive forces of said sources simultaneously and inversely.

46. The method of controlling an electric motor, which consists in supplying its armature from a dynamo-electric generator, supplying its field winding and the field winding of said generator from two sources of electromotive force respectively, varying the electromotive forces of said sources, and reversing the direction of the electromotive force of one of said sources.

47. A motor control system comprising a motor, a generator supplying the armature of said motor, two sources of electromotive force supplying the field windings of said generator and said motor respectively, and means for varying the electromotive forces of said two sources inversely.

48. A motor control system comprising a motor, a generator supplying the armature of said motor, two sources of electromotive force supplying the field windings of said generator and said motor respectively, and means for varying the electromotive forces of said two sources simultaneously.

49. A motor control system comprising a motor, a generator supplying the armature of said motor, two sources of electromotive force supplying the field windings of said generator and said motor respectively, and means for varying the electromotive forces of said two sources simultaneously and inversely.

50. A motor control system comprising a motor, a generator supplying the armature of said motor, two sources of electromotive force supplying the field windings of said generator and said motor respectively, and means for varying the electromotive forces of said two sources and for reversing the electromotive force of one of said sources.

51. A motor control system comprising a motor, a generator supplying the armature of said motor, two exciters supplying the field windings of said generator and said motor respectively, and means for varying the field strengths of said exciters inversely.

52. A motor control system comprising a motor, a generator supplying the armature of said motor, two exciters supplying the field windings of said generator and said motor respectively, and means for varying the field strengths of said exciters simultaneously.

53. A motor control system comprising a motor, a generator supplying the armature of said motor, two exciters supplying the field windings of said generator and said motor respectively, and means for varying the field strengths of said exciters simultaneously and inversely.

54. A motor control system comprising a motor, a generator supplying the armature of said motor, two exciters supplying the field windings of said generator and said motor respectively, and means for varying the field strengths of said exciters and for reversing the field of one of them.

In testimony whereof I affix my signature, in the presence of two witnesses.

WALTER J. RICHARDS.

Witnesses:
GEO. B. SCHLEY,
FRED J. KINSEY.